Oct. 24, 1950   J. R. POWELL ET AL   2,526,898
VAPOR TEMPERATURE CONTROL
Filed June 17, 1947   2 Sheets-Sheet 2
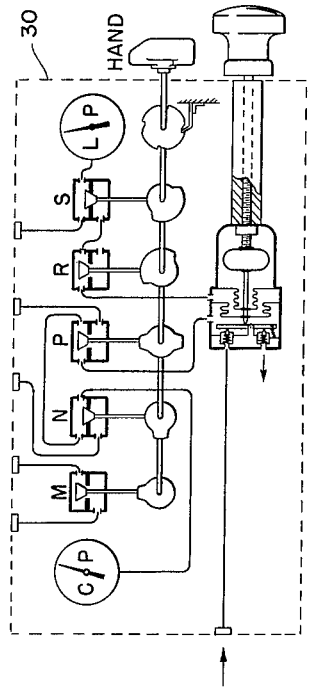
FIG. 2
| TRANSFER KNOB 34 POSITION | SHUT OFF VALVE POSITIONS | | | | |
|---|---|---|---|---|---|
| | M | N | P | R | S |
| HAND | OPEN | CLOSED | OPEN | OPEN | CLOSED |
| RESET | CLOSED | OPEN | CLOSED | CLOSED | OPEN |
| AUTOMATIC | CLOSED | CLOSED | OPEN | CLOSED | OPEN |
| RESET | CLOSED | CLOSED | CLOSED | OPEN | CLOSED |
FIG. 3
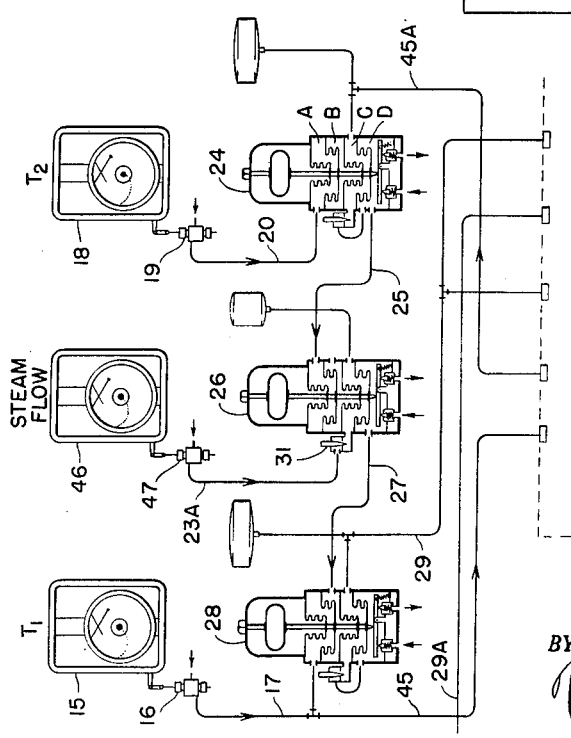
FIG. 4
*INVENTORS*
JOSEPH R. POWELL
AND HENRY R. FULTON
BY
Raymond W. Junkins
*ATTORNEY*

Patented Oct. 24, 1950

2,526,898

UNITED STATES PATENT OFFICE 2,526,898

VAPOR TEMPERATURE CONTROL

Joseph R. Powell and Henry R. Fulton, Dormont, Pa., assignors to Bailey Meter Company, a corporation of Delaware Application June 17, 1947, Serial No. 755,220

7 Claims. (Cl. 122—479)

Our invention relates broadly to fluid heat exchange apparatus for attemperating vapors or gases.

More specifically the invention relates to the control of a direct contact heat exchanger whereby such a fluid as superheated steam or superheated vapor may be maintained within desired temperature limits by spraying a lower temperature vaporizable liquid into the superheated steam or vapor. In the case of steam, the liquid is water.

We have chosen to illustrate our invention as applied to a fuel fired vapor generator having a primary and a secondary superheater series connected, with provision for spraying water into the flow path of the superheated steam between the two superheaters for tempering the steam and causing the total temperature of the steam leaving the unit to be maintained within desirable limits. It will be evident that our invention may be adapted to other arrangements of power producing or utilizing apparatus, and that we have merely chosen, by way of example, to illustrate and describe one preferred embodiment.

The invention is herein exemplified by the control of the rate of supply of water to an attemperator of the type described in the copending application of Fletcher et al. Serial No. 691,274, filed August 17, 1946, wherein a superheated steam conduit has therein a venturi acting as a part of a thermal sleeve to protect the conduit against thermal stresses. Forwardly of the entrance of the venturi is a spray nozzle through which water is atomized in a conical spray, which is enveloped by the high velocity superheated steam. The nozzle is thus disposed in a relatively low velocity zone so that there is a low pressure loss due to minimum turbulence created by the nozzle body. The water leaves the nozzle in the form of a spray cone with a hollow vortex, the outer limits of this cone being within the entrance surfaces of the venturi.

A principal object of the invention lies in the continuous control of the rate of water to the attemperator in accordance with selected variables in the operation of the unit, to the end that the final temperature of the steam will be maintained within desired limits.

Another object is to control the attemperator in such a manner that the steam produced by the unit will be within desired limits of total temperature at different rates of output.

Another object is to control the rate of supply of water in accordance with load demand as well as to correct for departure of the condition of the produced steam from desired condition.

A further object is to control the attemperator responsive to an indication of demand as well as responsive to an indication of one or more variable conditions of the steam.

Another object is to provide method and apparatus for controlling the supply of water to an attemperator responsive to rate of unit operation as well as to correct for tendencies of the produced steam to depart from desired final temperature.

Further objects will become evident from a study of the drawings and of the description thereof; the example given being one preferred embodiment of our invention.

In the drawings:

Fig. 2 illustrates the selector valve of Fig. 1 in a different position of operation.

Fig. 3 is a chart of valve combinations for the selector valve of Figs. 1 and 2.

Fig. 4 illustrates a modification of a portion of Fig. 1.

Figure 1:
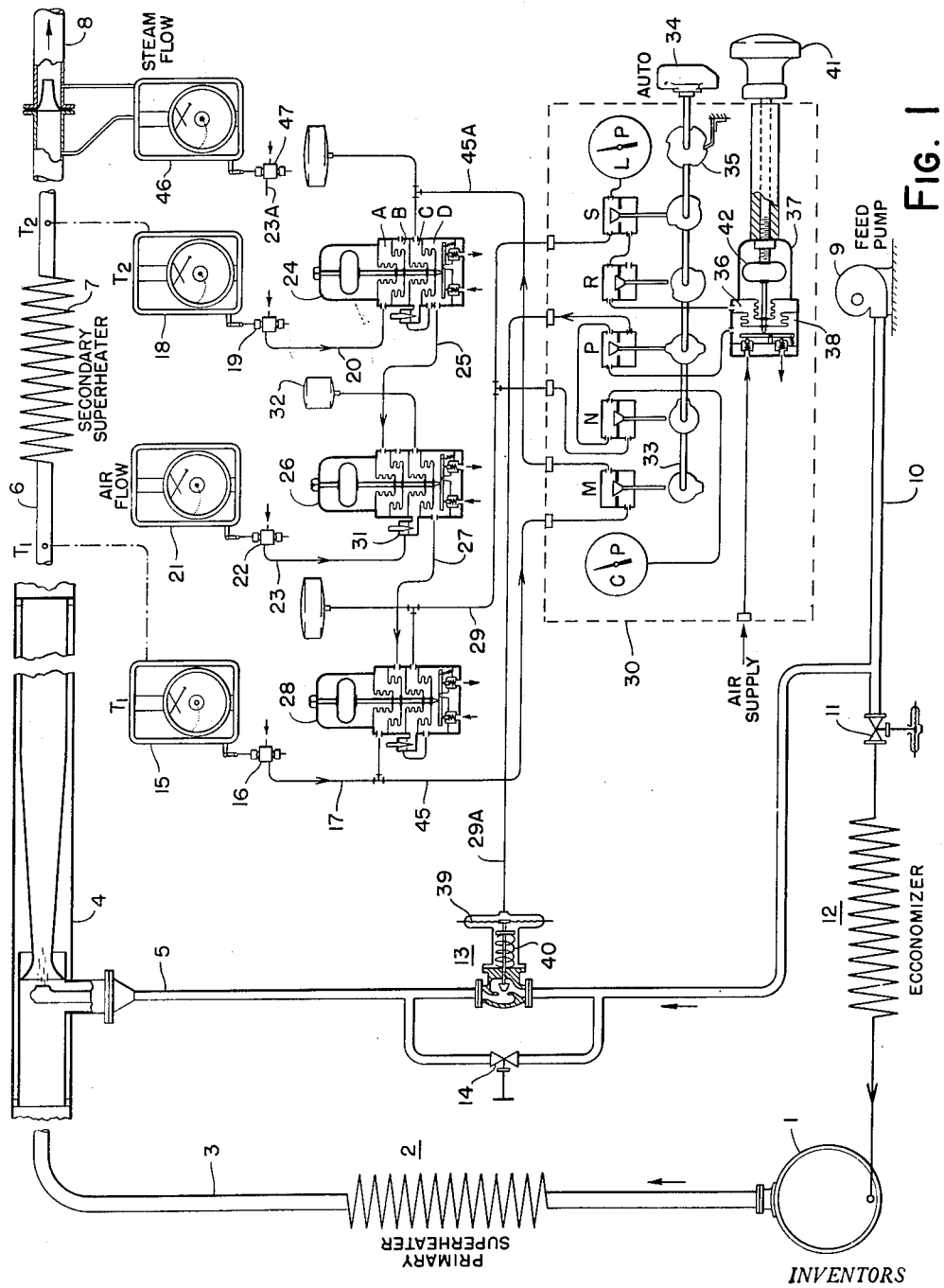
Fig. 1 is a diagrammatic view of a control system for a direct contact attemperator in a system for producing controlled temperature superheated steam.

In the system of Fig. 1 of the drawings, steam passes from the steam and water drum 1 of a steam generator through a gas heated primary superheater 2, an extension of the outlet tube 3 of the superheater providing an attemperator chamber 4. Inasmuch as the attemperator 4 is preferably of the type described in the copending application of Fletcher et al. it is unnecessary to herein go into the details of its construction and operation. It is the control of the rate of supply of attemperating water, through a pipe 5, that is the particular concern of the present invention.

The spray nozzle tube is connected to a source of relatively pure water at a pressure greater than the pressure of the steam passing through the attemperator 4, and this water is supplied to the spray nozzle at such a position that there is a minimum chilling effect upon the metal of the venturi, and particularly upon the metal at the venturi throat. This results from the location of the spray nozzle relative to the entrance of the venturi in such a manner that the spray from the nozzle is disposed in an envelope of steam accelerating to throat velocity and aspirating the water spray. The nozzle is also located in a relatively low velocity zone, which means low pressure loss due to whatever turbulence is created by the nozzle body.

Beyond the attemperator the steam passes through a conduit 6 to a second gas heated superheater 7, and thence through a conduit 8 to a point of use. In the present description we will refer to the first superheater 2 as a primary superheater and to the second superheater 7 as a secondary superheater, the two superheaters being connected for series flow of the steam produced by the vapor generator. It will be understood by those familiar with the art that the primary and secondary superheaters may either one be of the radiant or convection type, or either one may be subjected in part to radiant heat and in part to the heat of convection. The characteristics of the superheaters may be the same or they may differ one from the other insofar as the relation between load and steam temperature at the outlet of the superheater is concerned, depending upon many factors in the design and operation of such a unit. Usually the primary superheater is so located, and is so subjected to variables in the operation of the unit, that it is more affected by slagging, soot blowing, and like conditions, and is therefore more unstable than is the secondary superheater. Thus the temperature of the steam leaving the primary superheater is more likely to vary from a fixed value, at different rates and conditions of operation, than is the temperature of the steam leaving the secondary superheater. On the other hand, the heat absorbing characteristics of the secondary superheater are usually more stable in nature than those of the primary superheater. While the secondary superheater will normally remain cleaner, and thus more constant in its heat absorbing capabilities, still it will be understood that if steam of widely varying temperature is admitted to the secondary superheater a certain amount of the variations would normally persist through and to the exit of the secondary superheater. For these reasons the attemperator is preferably located between the two superheaters to smooth out as much as possible the fluctuations in steam temperature before the steam enters the secondary superheater.

In general, the control of water to the attemperator is responsive to an indication of load or demand upon the unit as a whole, as well as being responsive to the temperature of the steam leaving the attemperator and with a check-back from an indication of the final temperature of the steam leaving the secondary superheater. Merely for reference purposes we have designated the temperature of the steam leaving the attemperator as $T1$, and of the steam leaving the secondary superheater and therefore leaving the unit, as $T2$. As an indication of load or demand upon the unit we preferably utilize a measure of air flow, although under certain operating conditions a measure of the steam outflow rate may desirably be utilized.

By "air flow" we intend to include the rate of flow of the gaseous products of combustion and excess air passing through the generating unit, i. e., the assembly of vapor generator, primary superheater and secondary superheater. As is well known by those familiar with the art, air flow has long been utilized as an indication of firing rate or heat liberation, and thereby an indication of heat available for vaporizing liquid and superheating the vapor. On the other hand, the rate of flow of steam produced, under constant conditions of temperature and pressure, is a measure of heat absorption. When a vapor generator of the type being described is one of several supplying a header system, the rate of steam outflow may be a preferable guide to unit operation. On the other hand, when such a vapor generator supplies a single consumer, such as a turbine, the demand is relatively constant and variations in firing or heat absorption of the surfaces show up as variations in temperature and pressure of the produced steam. In either case, pressure is usually the index utilized to control the supply of the elements of combustion, and thereby the heat liberation, so that we may assume that steam outflow pressure is maintained substantially constant.

From this it will be apparent that the general premise exists that where a single vapor generator supplies a single vapor utilizer, the air flow is usually a preferable index of firing rate and heat availability, whereas when the vapor generator is one of a number supplying a header system the rate of steam outflow from the generator is a preferable index of load upon the unit. In Fig. 1, we have illustrated our control system utilizing air flow as the demand index whereas in Fig. 4 we have illustrated our invention utilizing steam outflow rate as a demand index.

Referring particularly to Fig. 1, we have indicated that the vapor generator is supplied with water from a feed pump 9 through a pipe 10, in which is positioned a regulating valve 11 at the entrance to an economizer 12. The valve 11 is preferably automatically controlled, although the control of the rate of supply of water fed to the generator does not form a part of the present invention, and may therefore be accomplished in one of numerous ways well known in the art.

The attemperator water supply pipe 5 is preferably joined to the pipe 10 between the feed pump 9 and the regulating valve 11, so that the water admitted to the nozzle of the attemperator 4 is under a pressure at least as high if not higher than that entering the economizer 12, and is therefore at a pressure higher than the steam entering the attemperator 4 from the pipe 3. Located in the pipe 5 is a regulating valve 13 for variably controlling the rate of supply of water to the attemperator nozzle. By-passing the valve 13 is a hand positionable control valve 14 in usual manner.

The general purpose of the present invention is to so control the attemperator 4 that the temperature $T2$ of the steam in the outflow conduit 8 is maintained within limits at a predetermined value. Thus the temperature $T2$ is the final resultant to be achieved, and therefore is the variable in the operation of the complete unit which is desirably utilized as a final check-back in the control system upon the positioning of the regulating valve 13. It is evident that for different rates of operation of the unit a different total rate of supply of water will be required to the attemperator for any given steam temperature difference. We have found that the most immediately responsive variable of operation to changes in rate of supply of water to the attemperator is the temperature $T1$ at the outlet of the attemperator, and therefore we utilize this temperature $T1$ preferably as a control element secondary to the total rate of operation variable.

In general then it may be said that we preferably control the rate of supply of water to the attemperator from three variables in the operation, namely, an indication of demand upon the unit, an indication of temperature at a location immediately affected by changes in rate of supply of attemperating water, and with a final check-back from an indication of the temperature of the steam after it has been successively subjected to an initial superheating, an attemperization, and a secondary superheating.

We provide a measuring instrument 15 for the temperature T1, preferably as a recorder-controller, providing a continuous indication or record of the temperature T1 and continuously positioning the movable portion of a pneumatic pilot valve 16, thereby establishing in a pipe 17 a pneumatic loading pressure continuously representative of the value of T1. In similar fashion the temperature T2 is recorded upon a recorder-controller 18 adapted to position a pilot valve 19 continuously establishing an air loading pressure in the pipe 20 representative of the value of T2. A recorder-controller 21 is sensitive to the value of air flow through the unit and positions the pilot valve 22 to continuously establish an air loading pressure in a pipe 23 representative of the air flow through the unit.

The pilot valves 16, 19 and 22 are preferably of the type disclosed and claimed in the patent to Johnson 2,054,464 and in the present disclosure are so arranged that an increase in value of T1, T2 or of air flow results in an upward movement of the valve stem. For purposes to be hereafter disclosed the pipe 23 is connected to the upper outlet of the pilot valve 22 and the pipe 20 is connected to the upper outlet of the pilot valve 19. The pipe 17, however, is connected to the lower outlet of the pilot valve 16. Thus upon an increase in value of T2, or of air flow, the loading pressure in the pipes 20 and 23 respectively will increase. On the other hand, upon an increase in value of T1 the loading pressure in the pipe 17 will decrease in value. In order to explain the operation of our preferred control system we will designate an increase in loading pressure as (+) and will designate a decrease in loading pressure as (—).

The pipe 20 is connected to the A chamber of a standardizing relay 24 of the type disclosed in the patent to Gorrie Re. 21,804. The outlet pipe 25 is connected to the A chamber of an averaging or totalizing relay 26 which is preferably of the type disclosed in the patent to Dickey 2,098,913. To the C chamber of the relay 26 we connect the pipe 23 so that the relay is subjected to air loading pressures representative of air flow and of T2. The combined result of these loading pressures is available within a pipe 27 applied to the B chamber of a standardizing relay 28, to the A chamber of which we connect the pipe 17. The output of the relay 28 is available through a pipe 29 to position the control valve 13. Interposed in the pipe 29 is a selector valve 30 which is preferably of the type disclosed in the patent to Fitch 2,202,485 providing the possibility of hand or automatic control of the valve 13.

The relay 24 is of the type disclosed and claimed in the patent to Gorrie Re. 21,804. Such a relay provides a proportional control with reset characteristics. It provides for the final control index (T2) a floating control of high sensitivity superimposed upon a positioning control of relatively low sensitivity. A function of the adjustable bleed connection in the relay 24 is to supplement the primary control of the pressure effective in pipe 25 with a secondary control of the same or different magnitude as a follow-up or supplementary action to prevent overtravel and hunting.

The relay 26 is an averaging relay in which the effects representative of air flow and of T2 are combined to provide a resultant control pressure in the pipe 27. The T2 effect is applied to the A chamber, while the air flow effect is applied to the C chamber, so that both effects act in the same direction in producing the control output of the relay. Desired relation between the two effects is attained by a throttling valve 31 in the pipe 23 and by a volume chamber 32 connected to the C chamber.

The relay 28 is a differential standardizing relay in general similar to relay 24. The T1 effect is applied to chamber A, while the resultant effect from relay 26 is applied to chamber B. The output of relay 28, through pipe 29, is taken from chamber C of the relay so that a floating type of control is provided whereby the valve 13 is positioned until the variables of the system are satisfied.

Interposed in the pipe 29, between the relay 28 and control valve 13, is the selector valve 30 providing a means whereby the control of the valve 13 may be automatic or may be by hand. In Fig. 1 the selector 30 is shown in automatic position, while in Fig. 2 we have shown it in hand position. Fig. 3 is a tabulation of the positions of the five valves of the selector in their four operating conditions. The five valves M, N, P, R and S are cam-operated through the agency of a shaft and selector knob 34, a notched wheel 35 providing locating means for the four positions tabulated in Fig. 3. It is intended that the sequence of passing from "hand" to "automatic," or from "automatic" to "hand" be accomplished by passing through a "reset" condition as will be explained.

In Fig. 1 the selector 30 is shown in "automatic" position. The final control pressure output of relay 28 is effective through valves S and R within a chamber 36 of a relay 37 providing a final control pressure in chamber 38 which is effective through valve P upon the diaphragm 39 of the control valve 13. The valve 13 is spring opened so that an increase in pressure acting upon the diaphragm 39 opposes the spring 40 to move the valve in a closing direction.

The operation of the system of Fig. 1 is as follows: An increase in value of T2 increases the pressure in chambers A and D of relay 24, A and D of relay 26, and B of relay 28. This produces a decrease in pressure in D and C of relay 28 as well as in chambers 36 and 38 of relay 37, and thus a decrease in pressure acting upon diaphragm 39, causing valve 13 to tend to open and increase the rate of supply of water to the spray nozzle for thereby decreasing the too-high T2.

In similar manner an increase in demand (air flow index) produces an increase in pressure in chambers C and D of relay 26 and chamber B of relay 28, thus a decrease in D and C of relay 28, as well as chambers 36 and 38 of relay 37, and again an opening of valve 13.

An increase in T1, however, causes a decrease in pressure in chambers A, D and C of relay 28, again decreasing the pressure in 36 and 38 of relay 37 and opening the valve 13.

Thus, an increase in load or in T1 or T2, or in any combination of these three variables, will result in an increase in rate of water supply to the attemperator 4. Obviously the measuring and controlling devices are provided with adjustments so that the desired effectiveness of the variables, upon the valve 13, may be properly coordinated.

When it is desired to remove the valve 13 from the influence of the control system and position it remotely by hand, the knob 34 is turned 180°, whereupon the valving arrangement of Fig. 2 will exist. Thereafter, the valve 13 may be positioned in an opening or in a closing direction by hand adjustment of the relay 37 through a knob 41 acting to load or unload a spring 42.

In the "hand" position of the selector 34 (Fig. 2) the shut-off valves M—N—P—R—S assume the positions tabulated opposite the "hand" in Fig. 3. The loading pressure output of the control system, available in pipe 29, is blocked from selector relay 37 and from valve 13, by the closed valves N and S. Chamber 36 of relay 37 is open to atmosphere by valve R. The hand adjusted output of relay 37, from chamber 38, is effective through valve P upon the diaphragm 39 of valve 13 for positioning the same. Thus, a rotation of knob 41 will load or unload relay spring 42 with corresponding increase or decrease in the pressure effective to close or open valve 13. So long as the selector knob 34 is in its "hand" position, the three operational variables, load, T1 or T2, are ineffective and the entire control of water to the attemperator 4, through valve 13, is under the dictates of hand control knob 41.

It will be observed that the pipe 17 has a branch 45, valved by M, and joining the C chamber of relay 24 as pipe 45A. In all positions of selector knob 34, except "hand," the valve M is closed. In the "hand" position valve M is open and the pressure in pipe 17, representative of T1, is imposed upon the C chamber of relay 24 so as to pre-set relay 24 very closely to the desired value to make the A and B chamber pressures in relay 28 substantially equal at all times that the selector 34 is in "hand" position. Thus, we preclude the possibility of the loading pressure in pipe 29 drifting to one extreme or the other during manual operation and obviating a possible bad bump in pressure upon valve 13 when switching back to "automatic." The "reset" conditions of valves M—N—P—R—S further operate to provide a smooth transition between "hand" and "automatic," or vice versa.

In Fig. 4 we have diagrammatically shown a second embodiment of our invention in which the index of load is represented as a measure of rate of flow of steam produced by the vapor generator. In Fig. 1 we illustrate a steam flow meter 46 arranged to continuously measure the steam passing through the outlet conduit 8 and adapted to position a pilot valve 47 establishing in the pipe 23A a fluid loading pressure continually representative of steam outflow rate. In Fig. 4 the meter 46 is utilized in the control arrangement of Fig. 1 as an indication of total load upon the system.

With certain combinations of apparatus and under certain operating conditions it may be preferable to use "air flow" as the load or demand index, while under other combinations and conditions it may be preferable to use "steam outflow rate" as the load or demand index. In either event the demand index comprises one of three operational variables interrelated to control the supply of water to the attemperator as illustrated and described herein. While preferably we have disclosed the two mentioned indexes of load or demand upon the unit, it will be appreciated that these species are merely representative and that there may be other variables in the operation of such a power producing or utilizing apparatus, which may equally as well be used as a representation of load demand in the preferred control system.

In the illustration of Fig. 4, and the description pertaining thereto, we have duplicated a portion of the arrangement of Fig. 1, substituting therein the steam flow rate meter 46 and pilot valve 47 for the air flow meter 21 and its pilot valve 22. We have not felt it necessary, in Fig. 4, to completely reproduce the remainder of Fig. 1, for it is quite evident to those familiar with the art that this would be an unnecessary expansion of the drawing.

While we have illustrated and described herein certain preferred embodiments of our invention, it will be understood that this is by way of example only and is not to be considered as limiting.

What we claim as new, and desire to secure by Letters Patent of the United States, is:

1. In combination with a vapor generator unit having a first superheater, an attemperator of the direct contact heat exchange type and a second superheater serially connected, means supplying vaporizable liquid to the attemperator for regulating the temperature of the vapor passing therethrough, a first meter measuring demand upon the unit, a second meter measuring temperature of the vapor leaving the attemperator, a third meter measuring temperature of the vapor as it leaves the second superheater, and control means for the liquid supplying means conjointly responsive to the three meters.

2. In combination with a vapor generator having a first superheater, an attemperator of the direct contact heat exchange type and a second superheater joined for serial flow of the vapor therethrough, means for heating the superheaters, liquid supply means arranged to supply vaporizable liquid under elevated pressure to the attemperator for tempering the condition of the vapor passing through the attemperator, a meter of the rate of flow of vapor leaving the second superheater, a first measuring means determining the temperature of the vapor between the attemperator and the second superheater, a second measuring means determining the temperature of the vapor leaving the second superheater, and control means for the liquid supply means conjointly responsive to the said meter and the first measuring means and the second measuring means.

3. In combination with a vapor generator system having a first superheater, an attemperator of the direct contact heat exchange type and a second superheater joined for serial flow of the vapor therethrough, means supplying heating gases to the superheaters, liquid supply means arranged to supply vaporizable liquid under elevated pressure to the attemperator for tempering the condition of the vapor passing therethrough, first metering means establishing a first control effect representative of demand upon the system, second metering means establishing a second control effect representative of vapor temperature between the attemperator and second superheater, third metering means establishing a third control effect representative of vapor temperature leaving the system, and control means for the liquid supply means continuously conjointly responsive to the three control effects.

4. The combination of claim 3 wherein the three control effects are fluid control pressures.

5. The combination of claim 3 wherein the first metering means establishes a first control effect representative of rate of flow of vapor leaving the system.

6. In combination with a vapor generator unit having a first superheater, an attemperator of the direct contact heat exchange type and a second superheater serially connected, means supplying heating gases to the superheaters, means supplying vaporizable liquid to the attemperator for regulating the temperature of the vapor passed therethrough, a first meter measuring the flow of heating gases, a second meter measuring temperature of the vapor leaving the attemperator, a third meter measuring temperature of the vapor as it leaves the second superheater, and control means for the liquid supplying means conjointly responsive to the three meters.

7. In combination with a vapor generator system having a first superheater, an attemperator of the direct contact heat exchange type and a second superheater joined for serial flow of the vapor therethrough, means supplying heating gases to the superheaters, liquid supply means arranged to supply vaporizable liquid under elevated pressure to the attemperator for tempering the condition of the vapor passing therethrough, first metering means establishing a first control effect representative of the rate of flow of heating gases, second metering means establishing a second control effect representative of vapor temperature between the attemperator and second superheater, third metering means establishing a third control effect representative of vapor temperature leaving the system, and control means for the liquid supply means continuously conjointly responsive to the three control effects.

JOSEPH R. POWELL.
HENRY R. FULTON.

REFERENCES CITED

The following references are of record in the file of this patent:

UNITED STATES PATENTS

| Number | Name | Date |
| --- | --- | --- |
| 2,202,485 | Fitch | May 28, 1940 |
| 2,319,223 | Frisch | May 18, 1943 |
| 2,421,761 | Rowand et al. | June 10, 1947 |

FOREIGN PATENTS

| Number | Country | Date |
| --- | --- | --- |
| 394,417 | Great Britain | June 29, 1933 |
| 399,937 | Great Britain | Oct. 19, 1933 |
| 515,067 | Great Britain | Nov. 24, 1939 |